United States Patent
Elfström et al.

(10) Patent No.: US 12,474,436 B2
(45) Date of Patent: *Nov. 18, 2025

(54) ENABLING DETERMINATION OF PROXIMITY BASED ON DETECTABLE PROXIMITY DETERMINERS

(71) Applicant: ASSA ABLOY AB, Stockholm (SE)

(72) Inventors: Jan Elfström, Landskrona (SE); Mikael Johansson, Lund (SE); Magnus Hansson, Malmö (SE)

(73) Assignee: ASSA ABLOY AB, Stockholm (SE)

(*) Notice: Subject to any disclaimer, the term of this patent is extended or adjusted under 35 U.S.C. 154(b) by 468 days.

This patent is subject to a terminal disclaimer.

(21) Appl. No.: 17/913,551

(22) PCT Filed: Mar. 24, 2021

(86) PCT No.: PCT/EP2021/057542
§ 371 (c)(1),
(2) Date: Sep. 22, 2022

(87) PCT Pub. No.: WO2021/191260
PCT Pub. Date: Sep. 30, 2021

(65) Prior Publication Data
US 2023/0098945 A1     Mar. 30, 2023

(30) Foreign Application Priority Data
Mar. 25, 2020   (SE) ...................... 2050329

(51) Int. Cl.
*G01S 5/14*     (2006.01)
*G01S 5/02*     (2010.01)

(52) U.S. Cl.
CPC .............. *G01S 5/14* (2013.01); *G01S 5/0252* (2013.01); *G01S 5/0278* (2013.01)

(58) Field of Classification Search
CPC ........ G01S 5/14; G01S 5/0252; G01S 5/0278; G01S 5/02; H04W 12/63; H04W 4/02; H04W 64/00; G07C 9/00309
See application file for complete search history.

(56) References Cited

U.S. PATENT DOCUMENTS

2014/0049361 A1   2/2014   Ahearn et al.
2014/0179338 A1   6/2014   Shang et al.
(Continued)

FOREIGN PATENT DOCUMENTS

CN   106662628   5/2017
CN   106664530   5/2017
(Continued)

OTHER PUBLICATIONS

Atia et al. "Dynamic Online-Calibrated Radio Maps for Indoor Positioning in Wireless Local Area Networks," IEEE Transactions on Mobile Computing, Sep. 2013, vol. 12, No. 9, pp. 1774-1787.

(Continued)

*Primary Examiner* — Umair Ahsan
(74) *Attorney, Agent, or Firm* — Schwegman Lundberg & Woessner, P.A.

(57) ABSTRACT

It is provided a method for enabling determination of proximity of a mobile device (2a, 2b) to a selected proximity determiner (3a). The method comprises the steps of: determining a base set of proximity determiners (3b-e) whereby an enlarged set of proximity determiners is defined as the selected proximity determiner and the base set of proximity determiners; receiving beacon measurements of signal strength of other proximity determiners in the enlarged set of proximity determiners; generating a two-dimensional graph based on the beacon measurements; receiving respective device measurements indicating signal strength of a signal from the mobile device at each proximity determiner in the enlarged set of proximity determiners; finding an optimum (Continued)

in a space defined by the two-dimensional graph; and determining the most probable position of the mobile device in the graph based on the optimum.

16 Claims, 3 Drawing Sheets

(56) References Cited

U.S. PATENT DOCUMENTS

| | | | |
|---|---|---|---|
| 2015/0230100 A1* | 8/2015 | Atia | H04W 16/22 370/252 |
| 2015/0362581 A1 | 12/2015 | Friedman et al. | |
| 2016/0055697 A1* | 2/2016 | Raina | G07C 9/15 340/5.7 |
| 2016/0379074 A1 | 12/2016 | Nielsen et al. | |
| 2017/0064515 A1 | 3/2017 | Heikkila et al. | |
| 2017/0359796 A1 | 12/2017 | Wirola et al. | |
| 2018/0067187 A1 | 3/2018 | Oh et al. | |
| 2018/0184287 A1 | 6/2018 | Khan et al. | |
| 2018/0255426 A1 | 9/2018 | Liao et al. | |
| 2019/0037419 A1 | 1/2019 | Knaappila | |
| 2021/0321223 A1 | 10/2021 | Adachi | |
| 2023/0121857 A1* | 4/2023 | Hansson | H04W 40/244 342/451 |

FOREIGN PATENT DOCUMENTS

| | | |
|---|---|---|
| CN | 107148578 | 9/2017 |
| CN | 108353248 | 7/2018 |
| CN | 108700643 | 10/2018 |
| EP | 2141957 | 1/2010 |
| EP | 3404438 | 11/2018 |
| GB | 0822520 | 1/2009 |
| KR | 10-1620285 | 5/2016 |
| WO | WO 2013/000073 | 1/2013 |
| WO | 2021191260 | 9/2021 |
| WO | WO-2021191262 A1 | 9/2021 |

OTHER PUBLICATIONS

Bandirmali et al. "ERLAK: On the Cooperative Estimation of the Real-Time RSSI Based Location and K Constant Term," Wireless Personal Communications, Feb. 2017, vol. 95, pp. 3923-3932.

Chen et al. "Robust Cooperative Wi-Fi Fingerprint-Based Indoor Localization," IEEE Internet of Things Journal, Dec. 2016, vol. 3, No. 6, pp. 1406-1417.

Destiarti et al. "Cluster-based PLE Areas for Mobile Cooperative Localization in Indoor Wireless Sensor Network," IEEE, 2016 8th International Conference on Information Technology and Electrical Engineering (ICITEE), Oct. 2016, 6 pages.

Guinness et al. "Visualizing Wi-Fi Access Point Measurements and Location Data Using Graph Layouts," IEEE, 2017 European Navigation Conference (ENC), May 2017, pp. 329-340.

Kamada et al. "An Algorithm for Drawing General Undirected Graphs," Information Processing Letters, Apr. 1989, vol. 31, No. 1, pp. 7-15.

Kim et al. "Passive WiFi Fingerprinting Method," IEEE, 2018 International Conference on Indoor Positioning and Indoor Navigation (IPIN), Sep. 2018, 8 pages.

Official Action for Sweden Patent Application No. 2050329-8, dated Mar. 3, 2021, 11 pages.

International Search Report and Written Opinion for International (PCT) Patent Application No. PCT/EP2021/057542, dated Jul. 12, 2021, 16 pages.

"International Application Serial No. PCT EP2021 057542, International Preliminary Report on Patentability mailed Oct. 6, 2022", 8 pgs.

"CN 202180023944.9 First Office Action mailed Apr. 1, 2024", with English translation, 20 pages.

"U.S. Appl. No. 17/913,569, Non Final Office Action mailed Feb. 11, 2025", 11 pgs.

"U.S. Appl. No. 17/913,569, Preliminary Amendment filed Sep. 22, 2022", 9 pgs.

"CN Application No. 202180024048.4 Chinese third Office Action mailed Dec. 5, 2024", with English translation, 18 pages.

"CN202180024048.4 Chinese First Office Action with search report mailed 03122024", with English translation, 17 pages.

"International Application Serial No. PCT/EP2021/057545, International Preliminary Report on Patentability mailed Oct. 6, 2022", 8 pgs.

"International Application Serial No. PCT/EP2021/057545, International Search Report mailed Jul. 12, 2021", 5 pgs.

"International Application Serial No. PCT/EP2021/057545, Written Opinion mailed Jul. 12, 2021", 7 pgs.

"Sweden Application No. 2050330-6, Office Action mailed date Mar. 3, 2021", 11 pgs.

Deng, Zhongliang, et al., "Indoor and Outdoor Wireless Positioning and Navigation", Beijing University of Posts and Telecommunications Press, with English translation, (Dec. 2013), 7 pages.

"U.S. Appl. No. 17/913,569, Response filed Apr. 30, 2025 to Non Final Office Action mailed Feb. 11, 2025", 12 pages.

* cited by examiner

ENABLING DETERMINATION OF PROXIMITY BASED ON DETECTABLE PROXIMITY DETERMINERS

CROSS REFERENCE TO RELATED APPLICATIONS

This application is a national stage application under 35 U.S.C. 371 and claims the benefit of PCT Application No. PCT/EP2021/057542 having an international filing date of Mar. 24, 2021, which designated the United States, which PCT application claimed the benefit of Sweden Patent Application No. 2050329-8 filed Mar. 25, 2020, the disclosure of each of which are incorporated herein by reference.

TECHNICAL FIELD

The present disclosure relates to the field of determination of mobile device proximity based on beacons.

BACKGROUND

Proximity determination of a mobile device can be used for many purposes. For instance, when mobile devices used as electronic keys are based on a wireless technology with a range of more than a few centimetres, e.g. for Bluetooth Low Energy (BLE), it is beneficial to know when a mobile device is proximate to a particular electronic lock. When the mobile device is proximate, access control can be triggered, whereby the electronic lock and the mobile device communicate for authentication and access control.

Traditionally, indoor positioning with BLE is based on accurate physical location measurements of BLE beacons that are overlaid on a physical map. Additionally, radio environment fingerprinting is often used to increase the positioning precision. Fingerprinting is based on many training measurement sessions being made after which, based on an average received signal strength indicator (RSSI) from many beacons, the position is determined based on a certain signal strength pattern for that particular location.

The fingerprinting requires a labour intense setup and calibration. Moreover, the fingerprints change over time when beacons are added or removed, or when furniture moves, whereby re-calibration is needed. The re-calibration is labour intensive, requiring significant effort and cost, and risks loss of accuracy if the labour-intensive re-calibration is not performed.

Another way in which proximity between the mobile device and another device, such as an electronic lock, can be determined is by taking RSSI measurements in either direction and comparing the RSSI measurement to certain threshold values. However, the RSSI measurements can vary greatly e.g. when the mobile device is in a hand or when the mobile device is in a bag.

SUMMARY

One objective is to enable a more robust way to determine proximity between a mobile device and a selected proximity determiner.

According to a first aspect, it is provided a method for enabling determination of proximity of a mobile device to a selected proximity determiner. The method is performed by a proximity determiner and comprises the steps of: determining a base set of proximity determiners being detectable from the selected proximity determiner and whereby an enlarged set of proximity determiners is defined as comprising the selected proximity determiner and the base set of proximity determiners; receiving, from each proximity determiner of the enlarged set of proximity determiners, beacon measurements of signal strength of other proximity determiners in the enlarged set of proximity determiners; generating a two-dimensional graph based on the beacon measurements; receiving, from each proximity determiner of the enlarged set of proximity determiners, respective device measurements indicating signal strength of a signal from the mobile device at each proximity determiner in the enlarged set of proximity determiners; finding an optimum in a space defined by the two-dimensional graph, based on a probability indicator of the mobile device being in a position based on sub-calculations, for each proximity determiner in the enlarged set of proximity determiners, based on a distance in the graph to the respective proximity determiner and the device measurement for the respective beacon; and determining the most probable position of the mobile device in the graph based on the optimum.

The step of finding an optimum may comprise finding an optimum based on a numerical optimisation of the probability indicator.

The method further comprises the step of: determining a finite number of potential positions of the mobile device in the two-dimensional graph. In this case, the step of finding an optimum comprises calculating the probability indicator for each potential position, and the determining optimum to be the most probable potential position, based on the calculated probability indicators.

The selected proximity determiner may be provided by an electronic lock for securing a restricted physical space, in which case the steps of receiving device measurements, finding an optimum and determining the most probable position are repeated for a plurality of different mobile devices. Moreover, the method then comprises the step of: triggering access control in the electronic lock for the mobile device having the shortest Euclidian distance between its most probable position and the selected proximity determiner in the graph.

The step of triggering access control in the electronic lock for the mobile device is only performed when the Euclidian distance between its most probable position and the selected proximity determiner in the graph is less than a threshold distance.

In the step of finding an optimum, each sub-calculation may be based on a similarity value between the distance in the graph to the respective proximity determiner and the device measurement for the respective beacon.

The step of finding an optimum may comprise calculating a probability indicator of the mobile device being in that position based the following formula:

$$P_{pos} = \sum_b \left| \log\left(\frac{d_b}{r_b}\right) \right|$$

where $P_{pos}$ is the probability indicator of the mobile device being in position pos, b represents the different proximity determiners, $d_b$ is distance in the graph to the proximity determiner b and $r_p$ is the device measurement for proximity determiner b.

According to a second aspect, it is provided a proximity determiner for enabling determination of proximity of a mobile device to a selected proximity determiner. The proximity determiner comprises: a processor; and a memory storing instructions that, when executed by the processor, cause the proximity determiner to: determine a base set of proximity determiners being detectable from the selected proximity determiner whereby an enlarged set of proximity determiners is defined as comprising the selected proximity determiner and the base set of proximity determiners; receive, from each proximity determiner of the enlarged set of proximity determiners, beacon measurements of signal strength of other proximity determiners in the enlarged set of proximity determiners; generate a two-dimensional graph based on the beacon measurements; receive, from each proximity determiner of the enlarged set of proximity determiners, respective device measurements indicating signal strength of a signal from the mobile device at each proximity determiner in the enlarged set of proximity determiners; finding an optimum in a space defined by the two-dimensional graph, based on a probability indicator of the mobile device being in a position based on sub-calculations, for each proximity determiner in the enlarged set of proximity determiners, based on a distance in the graph to the respective proximity determiner and the device measurement for the respective beacon; and determine the most probable position of the mobile device in the graph based on the optimum.

The instructions to find an optimum may comprise instructions that, when executed by the processor, cause the proximity determiner to find an optimum based on a numerical optimisation of the probability indicator.

The proximity determiner may further comprise instructions that, when executed by the processor, cause the proximity determiner to determine a finite number of potential positions of the mobile device in the two-dimensional graph; in which case the instructions to find an optimum comprises instructions that, when executed by the processor, cause the proximity determiner to calculate the probability indicator for each potential position, and the determining optimum to be the most probable potential position, based on the calculated probability indicators.

The selected proximity determiner may be provided by an electronic lock for securing a restricted physical space, in which case the proximity determiner comprises instructions that, when executed by the processor, cause the proximity determiner to: repeat the instructions to receive device measurements, finding an optimum and determine the most probable position for a plurality of different mobile devices; and trigger access control in the electronic lock for the mobile device having the shortest Euclidian distance between its most probable position and the selected proximity determiner in the graph.

In one embodiment, the instructions to trigger access control in the electronic lock for the mobile device are only performed when the Euclidian distance between its most probable position and the selected proximity determiner in the graph is less than a threshold distance.

The instructions to find an optimum may comprise instructions that, when executed by the processor, cause the proximity determiner to calculate each sub-calculation is based on a similarity value between the distance in the graph to the respective proximity determiner and the device measurement for the respective beacon.

The instructions to find an optimum may comprise instructions that, when executed by the processor, cause the proximity determiner to calculate a probability indicator of the mobile device being in that position based the following formula:

$$P_{pos} = \sum_b \left| \log\left(\frac{d_b}{r_b}\right) \right|$$

where $P_{pos}$ is the probability indicator of the mobile device being in position pos, b represents the different proximity determiners, $d_b$ is distance in the graph to the proximity determiner b and $r_p$ is the device measurement for proximity determiner b.

According to a third aspect, it is provided an electronic lock comprising the proximity determiner according to the second aspect.

According to a fourth aspect, it is provided a computer program for enabling determination of proximity of a mobile device to a selected proximity determiner. The computer program comprises computer program code which, when run on a proximity determiner causes the proximity determiner to: determine a base set of a proximity determiners being detectable from the selected proximity determiner whereby an enlarged set of proximity determiners is defined as comprising the selected proximity determiner and the base set of proximity determiners; receive, from each proximity determiner of the enlarged set of proximity determiners, beacon measurements of signal strength of other proximity determiners in the enlarged set of proximity determiners; generate a two-dimensional graph based on the beacon measurements; receive, from each proximity determiner of the enlarged set of proximity determiners, respective device measurements indicating signal strength of a signal from the mobile device at each proximity determiner in the enlarged set of proximity determiners; find an optimum in a space defined by the two-dimensional graph, based on a probability indicator of the mobile device being in that position based on sub-calculations, for each proximity determiner in the enlarged set of proximity determiners, based on a distance in the graph to the respective proximity determiner and the device measurement for the respective beacon; and determine the most probable position of the mobile device in the graph based on the optimum.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
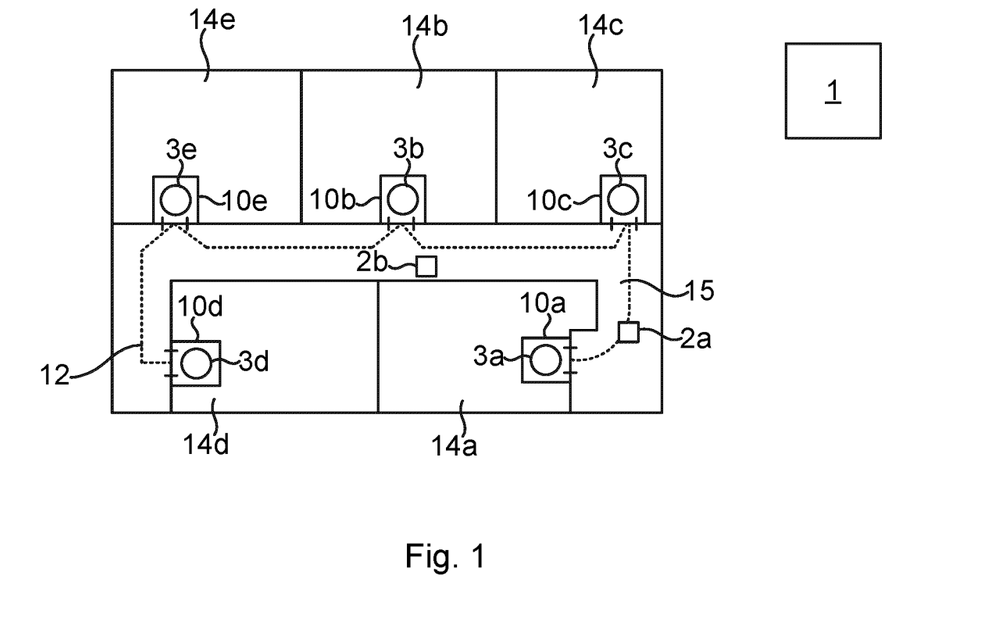
FIG. 1 is a schematic diagram illustrating an environment in which embodiments presented herein can be applied.

FIG. 1 is a schematic diagram illustrating an environment in which embodiments presented herein can be applied. A number of restricted physical spaces 14a-e are secured by respective electronic locks 10a-e. Each restricted physical space 14a-e can e.g. be a hotel room, a cruise ship cabin, a flat, an office space, etc. On the outside of the restricted physical spaces 14a-e, there is an accessible physical space 15, which in this example is a corridor. Adjacent or included in each electronic lock 10a-e is a respective proximity determiner 3a-e.

Each proximity determiner 3a-e regularly transmits a beacon, being a signal announcing presence of the proximity determiner 3a-e, e.g. as an advertisement. This signal contains an identifier of the transmitting proximity determiner. Each proximity determiner 3a-e can be a separate device or can form part of a more general radio transceiver, e.g. a BLE transceiver. Any receiver can measure signal strength of a received beacon, e.g. expressed as RSSI. In the embodiments presented herein, each one of the proximity determiners 3a-e also measures signal strength of detectable beacons of other proximity determiners, resulting in beacon measurements. The proximity determiners 3a-e can communicate with each other, e.g. over wired communication (e.g. Ethernet) or wireless communication (e.g. any of the IEEE 802.11x standards), whereby the proximity determiners 3a-e can share their beacon measurements with each other.

It is indicated a path 12 of a person carrying a first mobile device 2a. The first mobile device 2a can be any mobile electronic device which is capable of measuring RSSI and can communicate RSSI measurements to a proximity determiner 1. For instance, the mobile device 2 can be a wearable device, a smartphone, a tablet computer, etc. The path 12 starts at the first proximity determiner 3a, proceeds to the third proximity determiner 3c, on to the second proximity determiner 3b, on to the fifth proximity determiner 3e and finally to the fourth proximity determiner 3d.

There can be more mobile devices, such as a second mobile device 2b shown in FIG. 1. More or fewer mobile devices can also be present.

The order mentioned here for the devices, i.e. first, second, etc., does not have any significance other than to be provide the possibility to unambiguously refer to any one of the devices in FIG. 1.

A proximity determiner 1 is provided to enable determination of proximity of a mobile device to any one of the proximity determiners 3a-e as explained in more detail below. The proximity determiner can communicate, directly or indirectly, with each one of the proximity determiners 3a-e and the mobile devices 2a-b (when in range), e.g. over a wireless protocol such as BLE, Bluetooth, any of the IEEE 802.11x standards, any cellular network, etc.

While here depicted as a separate device, the proximity determiner 1 can also be embodied in each one of the proximity determiners 3a-e.

By determining when a mobile device functioning as an electronic key is near, i.e. proximate, to a particular proximity determiner, access control of the electronic lock can be triggered. This allows a user to keep the mobile device in a pocket or handbag and the electronic lock will unlock with no user involvement as the user approaches (as long as the mobile device is authorised to open the electronic lock).

Figure 2:
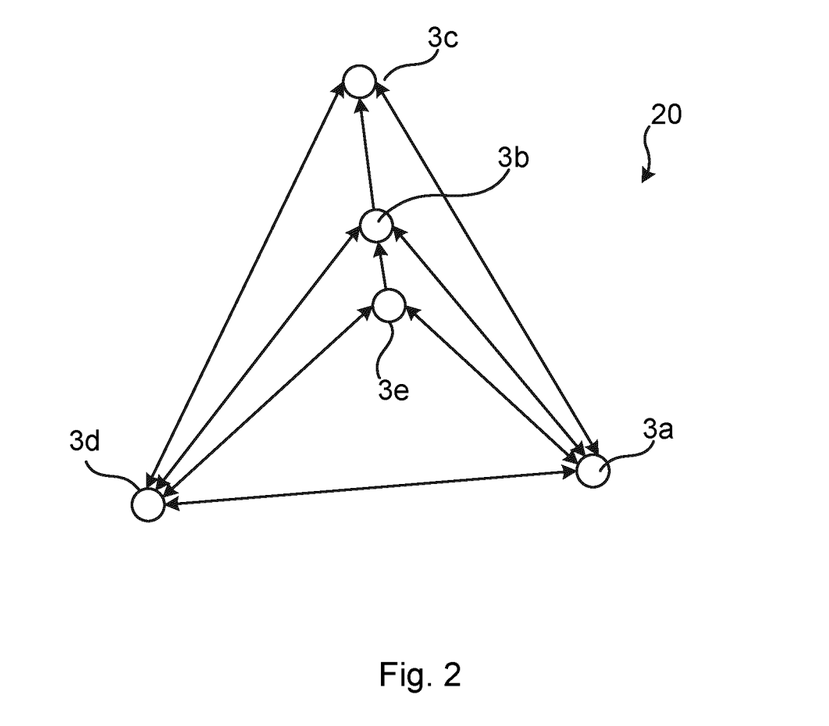
FIG. 2 is a two-dimensional graph which has been generated based on beacon measurements between the proximity determiners of FIG. 1.

FIG. 2 is a two-dimensional graph 20 which has been generated based on beacon measurements between the proximity determiners 3a-e of FIG. 1. The graph 20 is generated based on RSSI measurements between the proximity determiners 3a-e, as indicated by the arrows on the lines between the proximity determiners 3a-e. The length of the lines between two proximity determiners are indicative of (but not necessarily proportional to) an average RSSI between two proximity determiners. It is to be noted that RSSI between two proximity determiners does not need to be the same in both directions.

The graph 20 can be generated as a spring system, modelled in analogy with a physical system of mechanical springs. In the spring system, the nodes are the proximity determiners 3a-e and the average RSSI corresponds to a spring between two nodes. The graph can then be generated to minimise energy in the springs. This can e.g. be achieved using a Kamada-Kawai algorithm or a Fruchterman-Reingold algorithm.

The graph 20 is generated based on RSSI values such that proximity determiner pairs which have high RSSI values are near, e.g. the second proximity determiner 3b and the fifth proximity determiner 3e. Conversely, proximity determiner pairs which have low RSSI values are far away from each other, e.g. the first proximity determiner 3a and the fourth proximity determiner 3d.

Hence, since radio propagation has some relation to real-world geometry, there are some similarities between the graph 20 and the real-world map of FIG. 1.

Figure 3:
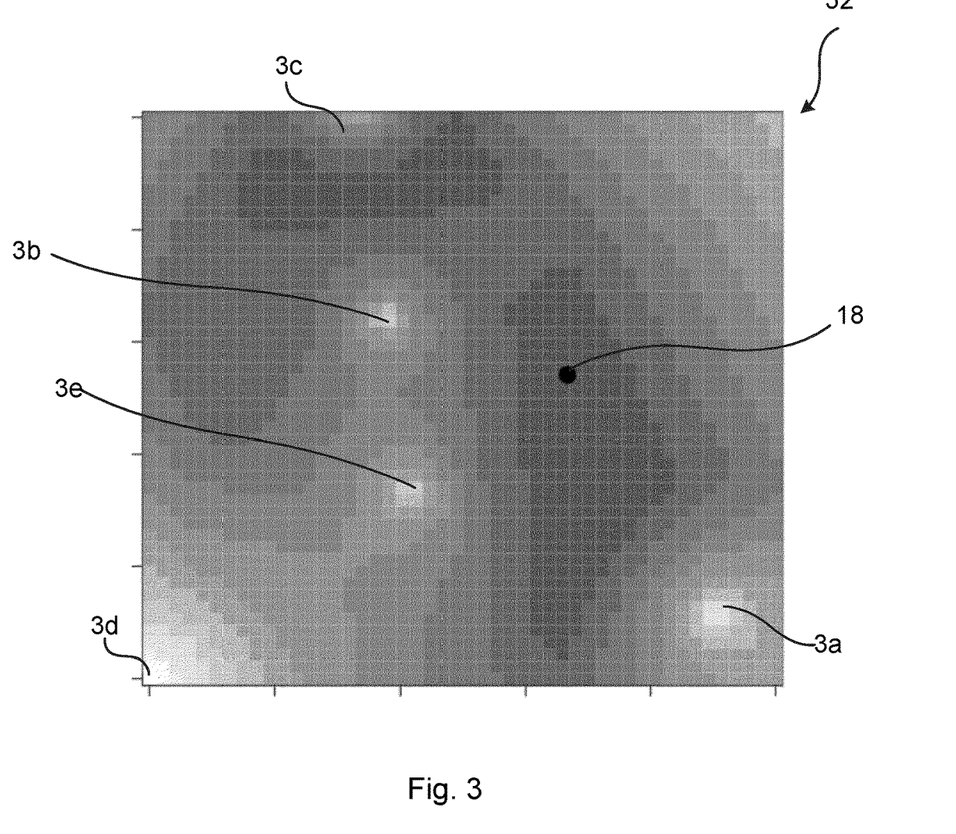
FIG. 3 is a heatmap illustrating probabilities of mobile device positions in the two-dimensional graph of FIG. 2 for a particular point in time.

FIG. 3 is a heatmap 32 illustrating probabilities of positions of a mobile device in the two-dimensional graph of FIG. 2 for a particular point in time. A darker shade indicates higher probability of the mobile device being there. The locations of the proximity determiners 3a-e are also indicated in the heatmap 32.

In this example, the heatmap has been generated for a time (on the path 12 of FIG. 1) when the mobile device is between the first proximity determiner 3a and the third proximity determiner 3c. The most probable position 18 is indicated. As expected, the most probable position 18 is between the first proximity determiner 3a and the third proximity determiner 3c in the heatmap. The most probable position 18 is a globally most probable position within the graph.

The heatmap is generated by calculating probability indicator for each discrete position as detailed below with reference to FIG. 5.

Figure 4:
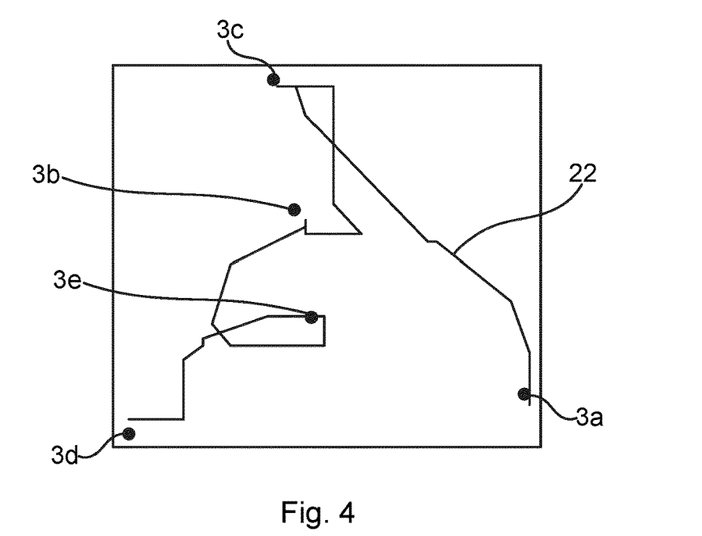
FIG. 4 is a schematic graph illustrating the most probable positions in the graph of FIG. 2 over time as a user follows the path in FIG. 1.

FIG. 4 is a schematic graph illustrating the most probable positions in the graph of FIG. 2 over time as a user follows the path 12 in FIG. 1. The positions of the proximity determiners 3a-e in FIG. 4 are the same as in the graph of FIG. 2. A path 22 is here shown, where each point in the path 22 is determined by calculating the most probable position at a certain point in time. As the first mobile device 2a moves along the path 12 in FIG. 1, the corresponding path 22 is generated here by joining the most probable positions, over time. Even though the layout of this graph is based on RSSI values, and is thus different than the actual layout of FIG. 1, it can be seen how the path 22 corresponds to the path 12 of FIG. 1 in terms of passing by the different proximity determiners 3a-e in the same order.

Figure 5:
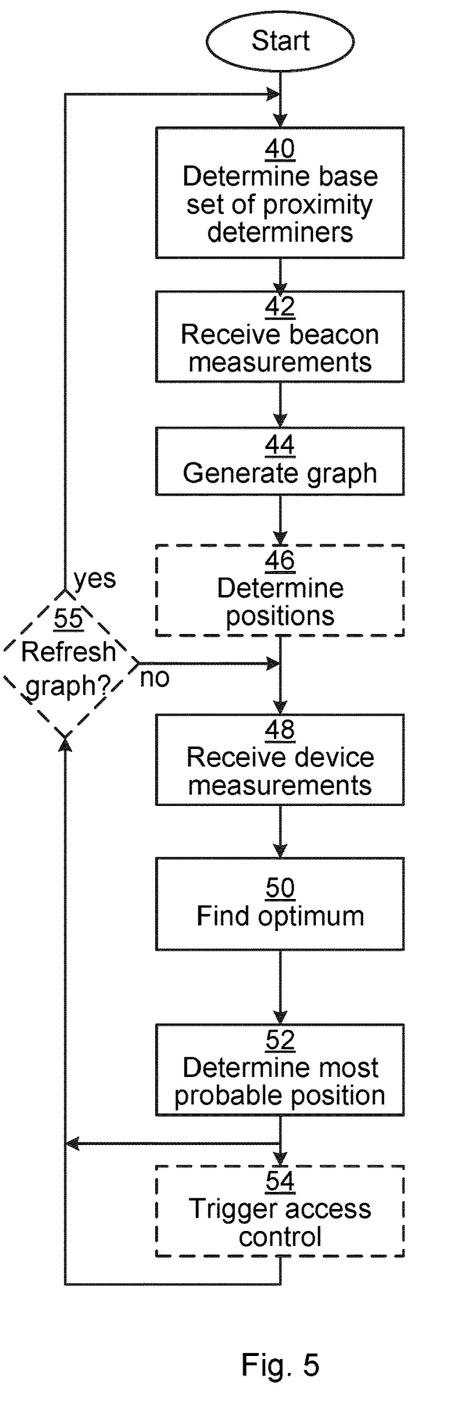
FIG. 5 is a flow chart illustrating embodiments of methods for enabling determining proximity of a mobile device to a selected proximity determiner.

FIG. 5 is a flow chart illustrating embodiments of methods for enabling determining proximity of a mobile device to a selected proximity determiner. The method is performed by a proximity determiner, which can be the selected proximity determiner or another proximity determiner.

In a determine base set of proximity determiners step 40, the proximity determiner determines a base set of proximity determiners being detectable from the selected proximity determiner. An enlarged set of proximity determiners is defined as comprising the selected proximity determiner and the base set of proximity determiners. The base set of proximity determiners can be defined as all proximity determiners that are detectable from the selected proximity determiner. Alternatively, the base set of proximity determiners can be defined as those proximity determiners that are detectable with a signal strength greater than a threshold. Alternatively, the base set of proximity determiners can be defined as the x number of strongest detected proximity determiners, or x number of proximity determiners with the lowest packet loss. x is then a configurable or dynamically determined number. On embodiment contains logic to prevent a disconnected graph, where the graph contains one or more proximity determiners that are not reliably detectable by other proximity determiners, forming a main set of proximity determiners.

In a receive beacon measurements step 42, the proximity determiner receives, from each proximity determiner of the enlarged set of proximity determiners, beacon measurements of signal strength of other proximity determiners in the enlarged set of proximity determiners. When the proximity determiner is embodied in the selected proximity determiner, the measurements by the selected proximity determiner are obtained using internal communication.

The beacon measurements can be averaged over a preconfigured number of measurements or over a preconfigured amount of time to obtain more stable measurements. It is not a great issue if this step takes some time, since it is only used to make a graph (see below). The positioning of the mobile device is subsequently based on the graph, but the graph is then pre-generated and does not need to be generated each time the positioning is performed.

The beacon measurements may differ depending on what channel they are transmitted on. In one embodiment, each beacon measurement is selected among the beacon measurements for different channels for the same beacon transmitter/receiver pair, that has the greatest RSSI value. In one embodiment, each beacon measurement is selected among the beacon measurements for different channels for the same beacon transmitter/receiver pair, that has the smallest RSSI value.

In a generate graph step 44, the proximity determiner generates a two-dimensional graph based on the beacon measurements. As part of this, a radio distance d can be calculated according to:

$$d = 10^{\frac{P_{Tx} - P_{Rx}}{10n}} \tag{1}$$

where $P_{Tx}$ is signal strength at one metre, $P_{Rx}$ is received signal strength and n is a configurable signal propagation parameter. Suitable values of n have been found to be between 2 and 4. An example of the two-dimensional graph is shown in FIG. 2 and is described above. The two-dimensional graph reflects the environment from a radio propagation perspective and is not dependent on physical map restrictions. This leads to more accurate positioning and does not rely on any manual recalibrations.

When this step is performed to refresh a previously generated graph, there is a risk that the refreshed graph becomes a mirror image of the previous graph, since the graph is only determined based on radio characteristics. To reduce this risk, this step optionally comprises comparing the newly determined graph with the previous graph to determine whether the newly determined graph has been mirrored and should be flipped. This comparison can e.g. be based on determining where a preconfigured number of strongest proximity determiners are located in the graphs, or based on determining the relation between the currently strongest beacons. This can be extended to a rotation-stable map algorithm that selects one or more nearby proximity determiners to always point in the same direction.

In one embodiment, this step comprises generating graphs for each floor in a multi-floor building. In this case, the proximity determiner needs to map each proximity determiner for which beacon measurements are received to a floor. This can be achieved e.g. by querying a lookup table or external server.

In an optional a determine positions step 46, the proximity determiner determines a finite number of potential positions of the mobile device in the two-dimensional graph. For instance, the proximity determiner can determine a matrix of potential positions, as illustrated in the heat map of FIG. 3.

In a receive device measurements step 48, the proximity determiner receives, from each proximity determiner of the enlarged set of proximity determiners, respective device measurements. Each device measurement indicates a signal strength of a signal from the mobile device to the respective proximity determiner (in the enlarged set of proximity determiners). The signal from the mobile device can be a beacon signal. Each proximity determiner thus measures the RSSI of the signal from the mobile device. It is to be noted that the signal strength can explicitly or implicitly (e.g. by its absence) indicate an absence of received signal from the mobile device.

In one embodiment, each device measurement is generated by combining device measurements for different channels for the mobile device, e.g. by adding, averaging or filtering the device measurements for the different channels for the mobile device.

In a find optimum step 50, the proximity determiner finds an optimum in a space defined by the two-dimensional graph. This is based on a probability indicator of the mobile device being in a position in the graph. The probability indicator is calculated based on sub-calculations for each proximity determiner in the enlarged set of proximity determiners. Each such sub-calculation is based on a distance (from an evaluated position) in the graph to the respective beacon and the device measurement for the respective beacon.

Each sub-calculation can be based on a similarity value between the distance in the graph (from the evaluated position) to the respective beacon and the device measurement for the respective beacon. The probability indicator for each position can then be determined as the sum of the similarity measurements for all of the proximity determiners in the enlarged set. The similarity value can be configured to be at a minimum when the two values are the same. Alternatively, the similarity value can be configured to be at a maximum when the two values are the same. In either case, the same principle is applied consistently.

In one embodiment, the probability indicator of the mobile device being in that position is calculated based the following formula:

$$P_{pos} = \sum_{b} \left| \log\left(\frac{d_b}{r_b}\right) \right| \qquad (2)$$

where $P_{pos}$ is the probability indicator of the mobile device being in position pos, b represents the different proximity determiners, $d_b$ is distance in the graph from the evaluated position pos to the proximity determiner b and $r_p$ is the device measurement for proximity determiner b. The phrase $$\left| \log\left(\frac{d_b}{r_b}\right) \right|$$

is then the similarity indicator, which is at a minimum when the distance in the graph to proximity determiner b and the device measurement of proximity determiner b are the same.

The optimum can be a local optimum. The optimum is a maximum if the probability indicator increases with increasing probability and the optimum is a minimum if the probability indicator decreases with increasing probability.

In one embodiment, the optimum is found based on a numerical optimisation of the probability indicator. Any suitable numerical optimisation algorithm can be used, e.g. Broyden-Fletcher-Goldfarb-Shanno algorithm.

In one embodiment, when step 46 is performed, the optimum is found by determining, for each potential position, the optimum to be the most probable potential position, based on the probability indicator. While this embodiment may involve more calculations than using numerical optimisation, by finding the optimum among all of the potential positions (within the graph) finds a global optimum (within the graph).

The probability indicators for each potential position can be visualised in a heatmap, e.g. as shown in FIG. 3.

Optionally, the potential positions are relatively scarcely determined to reduce the number of probability calculations. The global optimum of the potential positions can then be refined by using the global optimum (within the graph) as a starting position for the numerical optimisation.

In a determine most probable position step 52, the proximity determiner determines the most probable position of the mobile device in the graph based on the optimum. It is to be noted that the position is only determined in the graph, which is based on the radio environment. In other words, the position is not here determined as a position on a map reflecting geometric distances between proximity determiners. When a low probability indicator indicates a high probability of the mobile device being there, this implies that the most probable position is the position that has the lowest probability indicator (calculated in step 50). When a high probability indicator indicates a high probability of the mobile device being there, this implies that the most probable position is the position that has the highest probability indicator (calculated in step 50). With reference to FIG. 3, the most probable position 18 is indicated at that particular point in time. The method then returns to the receive device measurements step 48 to determine the most probable position for any other mobile devices in range. The mobile devices that are processed may be limited to those on a white list, e.g. containing mobile devices that are likely to be allowed access to an electronic lock by the selected proximity determiner.

In an optional trigger access control step 54, the proximity determiner triggers access control in the electronic lock for the mobile device having the shortest Euclidian distance between its most probable position and the selected proximity determiner in the graph. Optionally, access control is only triggered when the Euclidian distance between its most probable position and the selected proximity determiner in the graph is less than a threshold distance. This is to avoid access control to be performed in the electronic lock when the mobile device is still far away, which may lead to premature unlocking of the electronic lock, when the user carrying the mobile device might still be far away.

In an optional refresh graph step 55, the proximity determiner determines if the graph should be refreshed. This can e.g. be based on a certain amount of time having passed since the last refresh or that an operator has indicated that a refresh should be performed, e.g. if a proximity determiner has been removed or added. If the graph should be refreshed, the method returns to the determine base set of proximity determiners step 40. Otherwise, the method proceeds to the receive device measurements step 48 to determine new positions for the mobile device(s), optionally after an idle time.

The method is performed in parallel for each one of the proximity determiners in the same system.

By allowing the graph to be refreshed without operator involvement, the proximity determiner can obtain a graph which is reflective of a current radio environment without the need for any manual measurements or manual configuration.

Based on embodiments presented herein, by using the radio environment based two-dimensional graph and the device measurements, proximity between mobile device and proximity determiners is determined in a much more robust way than e.g. if simply RSSI measurements were to be used. Significantly, the most probable position is not dependent on accurate absolute RSSI values. Instead, the relationship between the RSSI values is exploited. This is of great value, since the RSSI measurements may vary greatly e.g. if the mobile device is held in a hand or is placed in a pocket or in a handbag. Hence, the embodiments presented herein can be used to robustly determine when a user is near a particular proximity determiner. Moreover, since the position in the graph is used to determine proximity, this position does not need to be translated to (or determined as a location on) a geometric map (being proportional to a physical space). Such map determination can be a lot more complicated and is not required for the proximity determination. Instead, the embodiments presented herein are based on determining a position in the graph, which is based on the radio environment rather than physical distances, to provide a reliable proximity determination.

Even though embodiments presented herein are often in an environment for determining proximity between a lock/ door and a key, embodiments presented herein can be applied for a number of different scenarios, such as for determining proximity to a great number of different types of assets, such as tags, carts or luggage.

Figure 6:
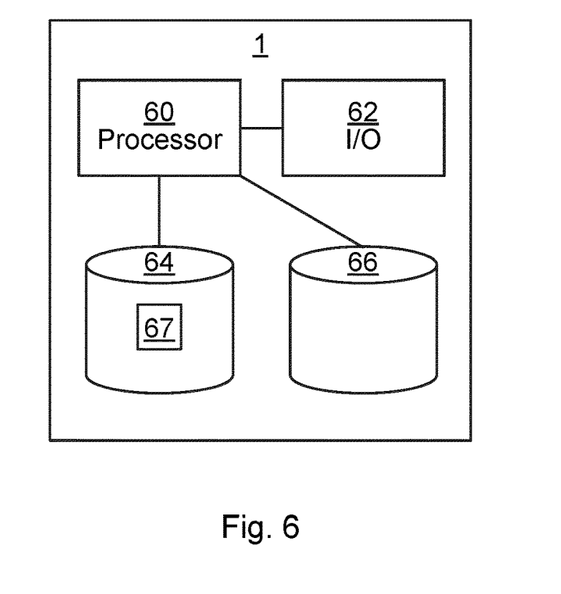
FIG. 6 is a schematic diagram illustrating components of the proximity determiner of FIG. 1.

FIG. 6 is a schematic diagram illustrating components of the proximity determiner 1 of FIG. 1. It is to be noted that one or more of the mentioned components can be shared with a host device in which the proximity determiner is embodied, e.g. a proximity determiner and/or an electronic lock. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 5 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The proximity determiner 1 further comprises an I/O interface 62 for communicating with external and/or internal entities.

Other components of the proximity determiner 1 are omitted in order not to obscure the concepts presented herein.

Figure 7:
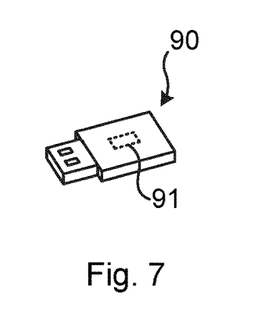
FIG. 7 shows one example of a computer program product comprising computer readable means.

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for enabling determination of proximity of a mobile device to a selected proximity determiner, the method being performed by a proximity determiner and comprising:
   determining a base set of proximity determiners being detectable from the selected proximity determiner and whereby an enlarged set of proximity determiners is defined as comprising the selected proximity determiner and the base set of proximity determiners;
   receiving, from each proximity determiner of the enlarged set of proximity determiners, beacon measurements of signal strength of other proximity determiners in the enlarged set of proximity determiners;
   generating a two-dimensional graph based on the beacon measurements;
   receiving, from each proximity determiner of the enlarged set of proximity determiners, respective device measurements indicating signal strength of a signal from the mobile device at each proximity determiner in the enlarged set of proximity determiners;
   finding an optimum in a space defined by the two-dimensional graph, based on a probability indicator of the mobile device being in a position based on sub-calculations, for each proximity determiner in the enlarged set of proximity determiners, based on a distance in the graph to the respective proximity determiner and the device measurement for the respective beacon; and
   determining the most probable position of the mobile device in the graph based on the optimum.

2. The method according to claim 1, wherein the finding an optimum comprises finding an optimum based on a numerical optimisation of the probability indicator.

3. The method according to claim 1, further comprising determining a finite number of potential positions of the mobile device in the two-dimensional graph, wherein the finding an optimum comprises calculating the probability indicator for each potential position, and determining the optimum to be a most probable of the potential positions, based on the calculated probability indicators.

4. The method according to claim 1, wherein the selected proximity determiner is provided by an electronic lock for securing a restricted physical space, and the receiving device measurements, finding an optimum and determining the most probable position are repeated for a plurality of different mobile devices, and wherein the method further comprises:
   triggering access control in the electronic lock for the mobile device having the shortest Euclidian distance between its most probable position and the selected proximity determiner in the graph.

5. The method according to claim 4, wherein the triggering access control in the electronic lock for the mobile device is only performed when the Euclidian distance between its most probable position and the selected proximity determiner in the graph is less than a threshold distance.

6. The method according to claim 1, wherein in the finding an optimum, each sub-calculation is based on a similarity value between the distance in the graph to the respective proximity determiner and the device measurement for the respective beacon.

7. The method according to claim 1, wherein the finding an optimum comprises calculating a probability indicator of the mobile device being in that position based on the following formula:

$$P_{pos} = \sum_{b} \left| \log\left(\frac{d_b}{r_b}\right) \right|$$

where $P_{pos}$ is the probability indicator of the mobile device being in position pos, b represents the different proximity determiners, $d_b$ is distance in the graph to the proximity determiner b and $r_b$ is the device measurement for proximity determiner b.

8. A proximity determiner for enabling determination of proximity of a mobile device to a selected proximity determiner, the proximity determiner comprising:
  a processor; and
  a memory storing instructions that, when executed by the processor, cause the proximity determiner to:
    determine a base set of proximity determiners being detectable from the selected proximity determiner whereby an enlarged set of proximity determiners is defined as comprising the selected proximity determiner and the base set of proximity determiners;
    receive, from each proximity determiner of the enlarged set of proximity determiners, beacon measurements of signal strength of other proximity determiners in the enlarged set of proximity determiners;
    generate a two-dimensional graph based on the beacon measurements;
    receive, from each proximity determiner of the enlarged set of proximity determiners, respective device measurements indicating signal strength of a signal from the mobile device at each proximity determiner in the enlarged set of proximity determiners;
    find an optimum in a space defined by the two-dimensional graph, based on a probability indicator of the mobile device being in a position based on sub-calculations, for each proximity determiner in the enlarged set of proximity determiners, based on a distance in the graph to the respective proximity determiner and the device measurement for the respective beacon; and
    determine the most probable position of the mobile device in the graph based on the optimum.

9. The proximity determiner according to claim 8, wherein the instructions to find an optimum comprise instructions that, when executed by the processor, cause the proximity determiner to find an optimum based on a numerical optimisation of the probability indicator.

10. The proximity determiner according to claim 8, further comprising instructions that, when executed by the processor, cause the proximity determiner to:
  determine a finite number of potential positions of the mobile device in the two-dimensional graph;
wherein the instructions to find an optimum comprise instructions that, when executed by the processor, cause the proximity determiner to calculate the probability indicator for each potential position, and determine the optimum to be a most probable of the potential positions, based on the calculated probability indicators.

11. The proximity determiner according to claim 8, wherein the selected proximity determiner is provided by an electronic lock for securing a restricted physical space, and the proximity determiner comprises instructions that, when executed by the processor, cause the proximity determiner to:
  repeat the instructions to receive device measurements, find an optimum and determine the most probable position for a plurality of different mobile devices; and
  trigger access control in the electronic lock for the mobile device having the shortest Euclidian distance between its most probable position and the selected proximity determiner in the graph.

12. The proximity determiner according to claim 11, wherein the instructions to trigger access control in the electronic lock for the mobile device are only performed when the Euclidian distance between its most probable position and the selected proximity determiner in the graph is less than a threshold distance.

13. The proximity determiner according to claim 8, wherein the instructions to find an optimum comprise instructions that, when executed by the processor, cause the proximity determiner to calculate each sub-calculation based on a similarity value between the distance in the graph to the respective proximity determiner and the device measurement for the respective beacon.

14. The proximity determiner according to claim 8, wherein the instructions to find an optimum comprise instructions that, when executed by the processor, cause the proximity determiner to calculate a probability indicator of the mobile device being in that position based on the following formula:

$$P_{pos} = \sum_{b} \left| \log\left(\frac{d_b}{r_b}\right) \right|$$

where $P_{pos}$ is the probability indicator of the mobile device being in position pos, b represents the different proximity determiners, $d_b$ is distance in the graph to the proximity determiner b and $r_b$ is the device measurement for proximity determiner b.

15. An electronic lock comprising the proximity determiner according to claim 8.

16. A non-transitory computer readable medium storing a computer program for enabling determination of proximity of a mobile device to a selected proximity determiner, the computer program comprising computer program code which, when run on a proximity determiner causes the proximity determiner to:
  determine a base set of a proximity determiners being detectable from the selected proximity determiner whereby an enlarged set of proximity determiners is defined as comprising the selected proximity determiner and the base set of proximity determiners;
  receive, from each proximity determiner of the enlarged set of proximity determiners, beacon measurements of signal strength of other proximity determiners in the enlarged set of proximity determiners;
  generate a two-dimensional graph based on the beacon measurements;
  receive, from each proximity determiner of the enlarged set of proximity determiners, respective device measurements indicating signal strength of a signal from the mobile device at each proximity determiner in the enlarged set of proximity determiners;
  find an optimum in a space defined by the two-dimensional graph, based on a probability indicator of the mobile device being in that position based on sub-calculations, for each proximity determiner in the enlarged set of proximity determiners, based on a distance in the graph to the respective proximity determiner and the device measurement for the respective beacon; and determine the most probable position of the mobile device in the graph based on the optimum.

* * * * *